(12) United States Patent
Hamamura et al.

(10) Patent No.: US 9,663,095 B2
(45) Date of Patent: May 30, 2017

(54) TRACTION CONTROL DEVICE

(71) Applicant: SUZUKI MOTOR CORPORATION, Hamamatsu-shi, Shizuoka (JP)

(72) Inventors: Masahiro Hamamura, Hamamatsu (JP); Yutaro Kobayashi, Hamamatsu (JP); Kazunori Kawai, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 130 days.

(21) Appl. No.: 14/532,215

(22) Filed: Nov. 4, 2014

(65) Prior Publication Data

US 2015/0127232 A1 May 7, 2015

(30) Foreign Application Priority Data

Nov. 6, 2013 (JP) ................................ 2013-230478
Nov. 6, 2013 (JP) ................................ 2013-230545
Nov. 6, 2013 (JP) ................................ 2013-230601

(51) Int. Cl.
*B60K 28/16* (2006.01)
*B60W 10/06* (2006.01)
(Continued)

(52) U.S. Cl.
CPC .............. *B60W 10/06* (2013.01); *B60K 28/16* (2013.01); *B60W 30/18172* (2013.01);
(Continued)

(58) Field of Classification Search
CPC .............. B60K 28/16; B60W 2520/26; B60W 30/18172
See application file for complete search history.

(56) References Cited

U.S. PATENT DOCUMENTS 5,572,970 A 11/1996 Fukumura
5,852,330 A 12/1998 Yumoto
(Continued)

FOREIGN PATENT DOCUMENTS

CN 102343905 A 2/2012
DE 4434536 A1 3/1995
(Continued)

OTHER PUBLICATIONS

German Office Action dated May 30, 2016 of the corresponding German Application No. 102014116156.4.
(Continued)

*Primary Examiner* — Tisha Lewis
(74) *Attorney, Agent, or Firm* — Troutman Sanders LLP

(57) ABSTRACT

A traction control device reducing an output of an engine unit for suppressing a spin of a driving wheel of a motorcycle, includes: a first spin detection unit detecting a spin of a rear wheel based on a vehicle speed calculated from a rotation of a front wheel being a driven wheel to which a driving force is not transmitted from the engine unit, and a vehicle speed calculated from a rotation of the rear wheel being the driving wheel to which the driving force is transmitted; and a second spin detection unit detecting the spin of the rear wheel based on a vehicle speed calculated from the rotation of the front wheel, and a vehicle speed calculated from a rotation of the engine unit.

14 Claims, 9 Drawing Sheets

(51) Int. Cl.
  *B60W 30/18* (2012.01)
  *F02D 41/00* (2006.01)
  *F02D 41/10* (2006.01)
  *F02D 41/14* (2006.01)
  *F02P 5/04* (2006.01)
  *F02P 5/15* (2006.01)
  *F02D 11/10* (2006.01)
  *F02D 37/02* (2006.01)
  *F02D 41/02* (2006.01)
  *B60W 40/10* (2012.01)

(52) U.S. Cl.
  CPC ........... *B60W 40/10* (2013.01); *F02D 11/105* (2013.01); *F02D 37/02* (2013.01); *F02D 41/0002* (2013.01); *F02D 41/008* (2013.01); *F02D 41/021* (2013.01); *F02D 41/10* (2013.01); *F02D 41/1497* (2013.01); *F02P 5/045* (2013.01); *F02P 5/1504* (2013.01); *F02P 5/1512* (2013.01); *B60W 2510/0666* (2013.01); *B60W 2520/04* (2013.01); *B60W 2520/10* (2013.01); *B60W 2520/26* (2013.01); *B60W 2520/28* (2013.01); *B60W 2540/10* (2013.01); *B60W 2710/0605* (2013.01); *B60W 2710/0633* (2013.01); *B60W 2710/0677* (2013.01); *B60Y 2200/12* (2013.01); *F02D 2200/101* (2013.01); *F02D 2200/501* (2013.01); *F02D 2250/18* (2013.01); *Y02T 10/42* (2013.01); *Y02T 10/46* (2013.01)

(56) References Cited

U.S. PATENT DOCUMENTS

| | | | |
|---|---|---|---|
| 8,543,301 | B1 | 9/2013 | Minami |
| 2005/0080547 | A1* | 4/2005 | Scelers ................. B60K 28/16 701/82 |
| 2010/0017077 | A1 | 1/2010 | Oshima et al. |
| 2011/0155100 | A1* | 6/2011 | Matsuda ................. B60K 28/16 123/406.19 |
| 2012/0022761 | A1 | 1/2012 | Matsuda |

FOREIGN PATENT DOCUMENTS

| | | | |
|---|---|---|---|
| DE | 19634203 A1 | 3/1997 | |
| DE | 102013002638 A1 | 9/2013 | |
| EP | 0294634 A2 * | 12/1988 | ............ B60K 28/16 |
| EP | 0668183 A1 | 8/1995 | |
| GB | 2500463 A | 9/2013 | |
| JP | S62-67257 | 3/1987 | |
| JP | S63-192927 | 8/1988 | |
| JP | H01-186437 | 7/1989 | |
| JP | H02-81734 | 3/1990 | |
| JP | H04-72445 | 3/1992 | |
| JP | H05-1613 | 1/1993 | |
| JP | 2003-003941 | 1/2003 | |
| JP | 2003-201878 | 7/2003 | |

OTHER PUBLICATIONS

Chinese Office Action dated Aug. 31, 2016 issued in corresponding Chinese Patent Application No. 201410621039.5.

* cited by examiner

F I G. 1
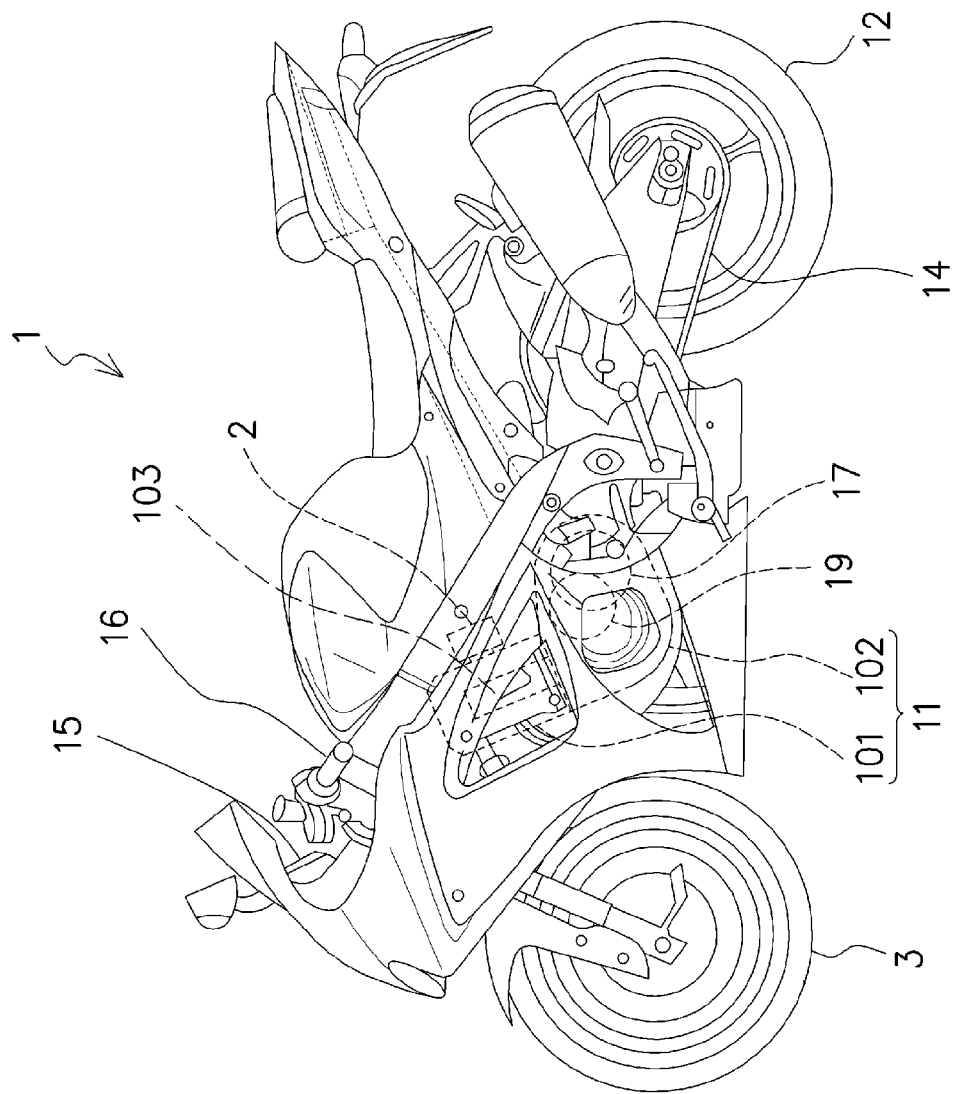

F I G. 4

| REAR WHEEL-ENGINE ROTATION SPEED (r.p.m) | 1000 | 2000 | ... | 12000 |
|---|---|---|---|---|
| TOLERANCE VALUE (r.p.m) | aaa | bbb | ... | zzz |

FIG. 8

| CYCLE \ CYLINDER | #1 | #2 | #4 | #3 |
|---|---|---|---|---|
| 1 | *0.3* | *25.3* | 50.3 | 75.3 |
| 2 | *37.8* | 62.8 | 87.8 | *22.2* |
| 3 | 81.6 | *6.6* | *31.6* | 56.6 |
| 4 | *44.1* | 94.1 | *19.1* | 69.1 |
| 5 | *5.3* | *29.4* | 79.4 | 54.4 |
| 6 | 66.9 | *41.9* | *16.9* | 91.9 |
| 7 | *35.6* | 60.6 | 85.6 | *10.6* |
| 8 | *48.1* | *23.1* | 73.1 | 98.1 |
| 9 | 52.2 | *2.2* | 77.2 | *27.2* |
| 10 | *14.7* | 89.7 | *39.7* | 64.7 |
| 11 | 83.4 | 58.4 | *8.4* | *33.4* |
| 12 | *45.9* | 95.9 | *20.9* | 70.9 |
| 13 | 80.0 | *30.0* | 55.0 | *5.0* |
| 14 | | *42.5* | 92.5 | 67.5 |
| 15 | 61.3 | *36.3* | *11.3* | 86.3 |
| 16 | *48.8* | 73.8 | 89.8 | 23.8 |
| 17 | *1.6* | 51.6 | *26.6* | *76.6* |
| 18 | 64.1 | *39.1* | 89.1 | *14.1* |
| 19 | 82.8 | *7.8* | *32.8* | 57.8 |
| 20 | *20.3* | *45.3* | 70.3 | 85.3 |

TRACTION CONTROL DEVICE

CROSS-REFERENCE TO RELATED APPLICATIONS

This application is based upon and claims the benefit of priority of the prior Japanese Patent Application No. 2013-230478, filed on Nov. 6, 2013, the prior Japanese Patent Application No. 2013-230545, filed on Nov. 6, 2013, and the prior Japanese Patent Application No. 2013-230601, filed on Nov. 6, 2013, the entire contents of which are incorporated herein by reference.

BACKGROUND OF THE INVENTION

Field of the Invention

The present invention relates to a traction control device. The present invention particularly relates to a traction device of a vehicle for preventing or suppressing a spin of a driving wheel by controlling an output of an engine.

Description of the Related Art

In a vehicle such as a motorcycle, if a throttle opening degree is increased rapidly at a time of starting and at a time of traveling, a driving wheel (generally a rear wheel) sometimes spins. Accordingly, various types of so-called traction controls for suppressing a spin of a rear wheel (driving wheel) of a motorcycle have been conventionally proposed. For example, there is a traction control in which an ignition timing of an engine is delayed when a spin occurs to suppress an engine output, thereby reducing the spin of a rear wheel. Further, there is a traction control in which a sub-throttle valve is provided, in addition to a main throttle valve, and when a spin of a rear wheel occurs, an opening degree of the sub-throttle valve is throttled regardless of a throttle operation of a driver to suppress an engine output, thereby reducing the spin of the rear wheel. Further, a traction control in which when a spin of a rear wheel occurs, both of the aforementioned delay control and control of opening degree of the sub-throttle valve are carried out, has also been proposed.

Conventionally, a method of traction control includes a method in which a spin is detected from a vehicle speed difference (circumferential speed difference) calculated from rotation speeds of a driving wheel and a driven wheel. However, the method in which the spin is detected from the vehicle speed difference of the driving wheel and the driven wheel, sometimes causes the following problems. For example, in a motorcycle, there exist an allowance of a transmission, a drive chain and the like, and a lot of the other shock-absorbing materials such as a clutch, a wheel, and a tire, between an engine and a driving wheel. For this reason, a certain amount of time is required for transmitting a reaction of the engine to the driving wheel. Accordingly, even if a rotation speed of the engine is rapidly increased at a certain moment, an influence thereof is not immediately transmitted to the driving wheel, and there exists a time lag. Therefore, in the method of detecting the spin by using the vehicle speed of the driving wheel, a determination whether the spin occurs is delayed, resulting in that the increase in the rotation speed of the engine cannot be suppressed quickly. As a result of this, a variation of the rotation of the engine becomes large, and a coarse control with a large behavior of vehicle body is carried out.

Other than the above, a method of detecting a spin by using a rotation speed of an engine and a vehicle speed of a driven wheel, has been proposed (Patent Document 1). With the use of a configuration as above, since it is possible to determine the spin at a moment at which the rotation of the engine is rapidly increased, the problems as described above can be solved. However, the configuration which uses the engine speed causes the following problems. Specifically, when a driver disconnects a clutch to perform a racing operation, the engine speed is increased. Consequently, since it is determined that the spin occurs, the traction control is intervened. As above, in the configuration of using the engine speed, the use of the configuration is limited only to the state where the clutch is connected. Therefore, it is not possible to apply the configuration to a case where the clutch is disconnected as in a time of starting.

Further, in the traction control as described above, it is experientially clarified that in the configuration in which an ignition timing of all cylinders of the engine is simply delayed, a sufficient recovery of grip cannot be expected, and it is better to thin-out a cylinder whose ignition timing is delayed. On the contrary, Patent Document 2 discloses a configuration in which when a spin of a driving wheel is detected, an ignition timing is delayed to reduce an engine output, but, a concrete control method of the ignition timing is not disclosed.

Although Patent Document 3 discloses a configuration in which a delay is caused by performing thinning-out every one ignition, for the purpose of suppressing a knocking, even if this configuration is applied to the traction control, a range of suppression of output is limited to 50% at maximum. For this reason, in a case where a traveling is performed on a road surface with a low friction coefficient and the like, a spin of a driving wheel cannot be prevented. Further, a proper thinning-out rate for a recovery of grip is different in accordance with a specification of an engine, so that a sufficient recovery of grip cannot be expected with the use of the configuration in which the thinning-out is performed every one ignition with respect to all engines.

Further, in the delay control for the suppression of spin, the ignition timing is generally delayed from a point of view of protection of catalyst. In the delay control, since an output can be controlled every ignition, it is possible to perform control with good response characteristic. However, if a delay amount becomes large, there are possibilities that a combustion state is worsened to cause a backfire and an after-burn, and an exhaust-gas temperature is increased, resulting in that the catalyst is damaged. Accordingly, a range of an output reduction realized by the delay control is limited, and it is difficult to deal with a situation where a large output reduction is required, such as a time of traveling on a road surface with a low friction coefficient.

Meanwhile, with the use of the control of opening degree of the sub-throttle valve, a range of an output reduction is large, and there is no possibility of worsening of combustion state and damage of catalyst. However, the control of opening degree of the sub-throttle valve has a problem that the response characteristic is low. Specifically, even if an instruction of throttling the opening degree of the sub-throttle valve is given at a moment of occurrence of spin, it takes a long time to perform operation. Further, since it takes a long time to complete the reduction in output as well, it is difficult to instantaneously reduce the spin. Further, when an instruction of recovery is given, since it takes a long time to recover the output, an acceleration becomes slow, resulting in that a driving performance is lowered.

Patent Document 4 discloses a configuration in which both of the delay control of the ignition timing and the control of opening degree of the sub-throttle valve are carried out, but, the configuration as above causes problems regarding the control of opening degree of the sub-throttle valve. Specifically, since the control of opening degree is conducted even in a case where a spin amount is small and the spin can be reduced only by the delay control, the response characteristic is low.

[Patent Document 1] Japanese Laid-open Patent Publication No. 01-186437
[Patent Document 2] Japanese Laid-open Patent Publication No. 04-72445
[Patent Document 3] Japanese Laid-open Patent Publication No. 2003-3941
[Patent Document 4] Japanese Laid-open Patent Publication No. 62-67257
[Patent Document 5] Japanese Laid-open Patent Publication No. 02-81734
[Patent Document 6] Japanese Laid-open Patent Publication No. 2003-201878
[Patent Document 7] Japanese Laid-open Patent Publication No. 05-1613
[Patent Document 8] Japanese Laid-open Patent Publication No. 63-192927

SUMMARY OF THE INVENTION

In view of the above-described circumstances, the problem to be solved by the present invention is to realize a traction control capable of preventing or suppressing a spin of a driving wheel even in a case where a clutch is not connected, and capable of suppressing a variation of an engine speed. Further, the problem to be solved by the present invention is to realize a traction control capable of changing a thinning-out rate in accordance with a specification of an engine, and to realize a traction control capable to dealing with a traveling on a road surface with a low friction coefficient as well. Further, the problem to be solved by the present invention is to realize a traction control capable of preventing or suppressing a damage of a catalyst, and having a good response characteristic.

In order to solve the above-described problems, the present invention is a traction control device reducing an output of an engine for suppressing a spin of a driving wheel of a vehicle, characterized in that it includes: a first spin detection unit detecting the spin of the driving wheel based on a vehicle speed calculated from a rotation of a driven wheel to which a driving force is not transmitted from the engine, and a vehicle speed calculated from a rotation of the driving wheel to which the driving force is transmitted from the engine; and a second spin detection unit detecting the spin of the driving wheel based on a speed of the vehicle calculated from the rotation of the driven wheel, and a speed of the vehicle calculated from a rotation of the engine.

It is also possible to configure such that a traveling determination unit determining whether the vehicle is in a starting state or a traveling state is further provided, in which when the traveling determination unit determines that the vehicle is in the starting state, the first spin detection unit detects the spin of the driving wheel, and when the determination unit determines that the vehicle is in the traveling state, the second spin detection unit detects the spin of the driving wheel.

It is also possible to configure such that a clutch connecting or disconnecting the transmission of the driving force between the engine and the driving wheel is further provided, in which the determination unit determines that the clutch is connected when a rotation speed of the engine calculated from a rotation speed of the driving wheel falls within a predetermined range with respect to an actual rotation speed of the engine.

It is also possible to configure such that the determination unit determines that the vehicle is in the traveling state when a state in which the clutch is connected lasts for a predetermined period of time.

It is also possible to configure such that the determination unit determines that the clutch is not connected when the rotation speed of the engine calculated from the rotation speed of the driving wheel does not fall within the predetermined range with respect to the actual rotation speed of the engine.

It is also possible to configure such that the determination unit determines that the vehicle is in the starting state when a state in which the clutch is not connected lasts for a predetermined period of time.

The present invention is a traction control device reducing an output of an engine for suppressing a spin of a driving wheel of a vehicle, characterized in that it calculates an output reduction rate of the engine in accordance with a search spin rate being a value as a result of subtracting a previously specified threshold value from a spin rate of the driving wheel.

It is also possible to configure such that a plurality of modes each having a different relationship between the search spin rate and the output reduction rate are provided, in which the mode in accordance with a selection made by a driver is used.

It is also possible to configure such that the engine has a plurality of cylinders, and in accordance with a thinning-out rate being a proportion of cylinders, out of the plurality of cylinders, from which an output is reduced, the cylinder from which the output is reduced is selected from the plurality of cylinders for each cycle.

It is also possible to configure such that a matrix table in which a numeric value of 0 to 100 is randomly assigned, to each of the plurality of cylinders along a plurality of cycles, for each of the cycles is provided, and the output is reduced, regarding each of the plurality of cylinders, in the cycle to which the numeric value equal to or less than the thinning-out rate is assigned by the matrix table.

It is also possible to configure such that when the output reduction rate cannot be realized by the reduction in the output of the selected cylinders, the reduction in the output of the selected cylinders is maximized, and an output of the remaining cylinders is also reduced.

The present invention is a traction control device reducing an output of an engine for suppressing a spin of a driving wheel of a vehicle, characterized in that it can execute a delay control of reducing the output of the engine by delaying an ignition timing of the engine, and an intake control of reducing the output of the engine by reducing an amount of air for combustion which is supplied to the engine, in which the delay control is started in preference to the intake control.

It is also possible to configure such that the intake control is started when a state in which a moving average of a required output reduction rate is equal to or greater than a predetermined determination value lasts for a predetermined period of time.

It is also possible to configure such that the intake control is terminated when a state in which the moving average of the required output reduction rate is equal to or less than a predetermined determination value lasts for a predetermined period of time.

It is also possible to configure such that a main throttle valve operated by a driver and a sub-throttle valve which is different from the main throttle valve are further provided, in which in the intake control, the output of the engine is reduced by throttling an opening degree of the sub-throttle valve.

BRIEF DESCRIPTION OF THE DRAWINGS

FIG. 1 is a side view schematically illustrating a configuration of a motorcycle related to an embodiment of the present invention.

FIG. 4 is a schematic diagram illustrating an example of a tolerance value table.

FIG. 8 illustrates an example of a thinning-out table used for selecting a cylinder whose ignition timing is delayed.

DETAILED DESCRIPTION OF THE PREFERRED EMBODIMENTS

Hereinafter, an embodiment of the present invention will be described in detail with reference to the drawings. In the embodiment of the present invention, a motorcycle will be illustrated as an example of a vehicle being a target of control. In the present embodiment, "traction control" indicates a control in which when a driving wheel spins, the spin is suppressed or prevented by reducing an output of a driving force source.

(Configuration of Motorcycle and Control Device)

Figure 2:
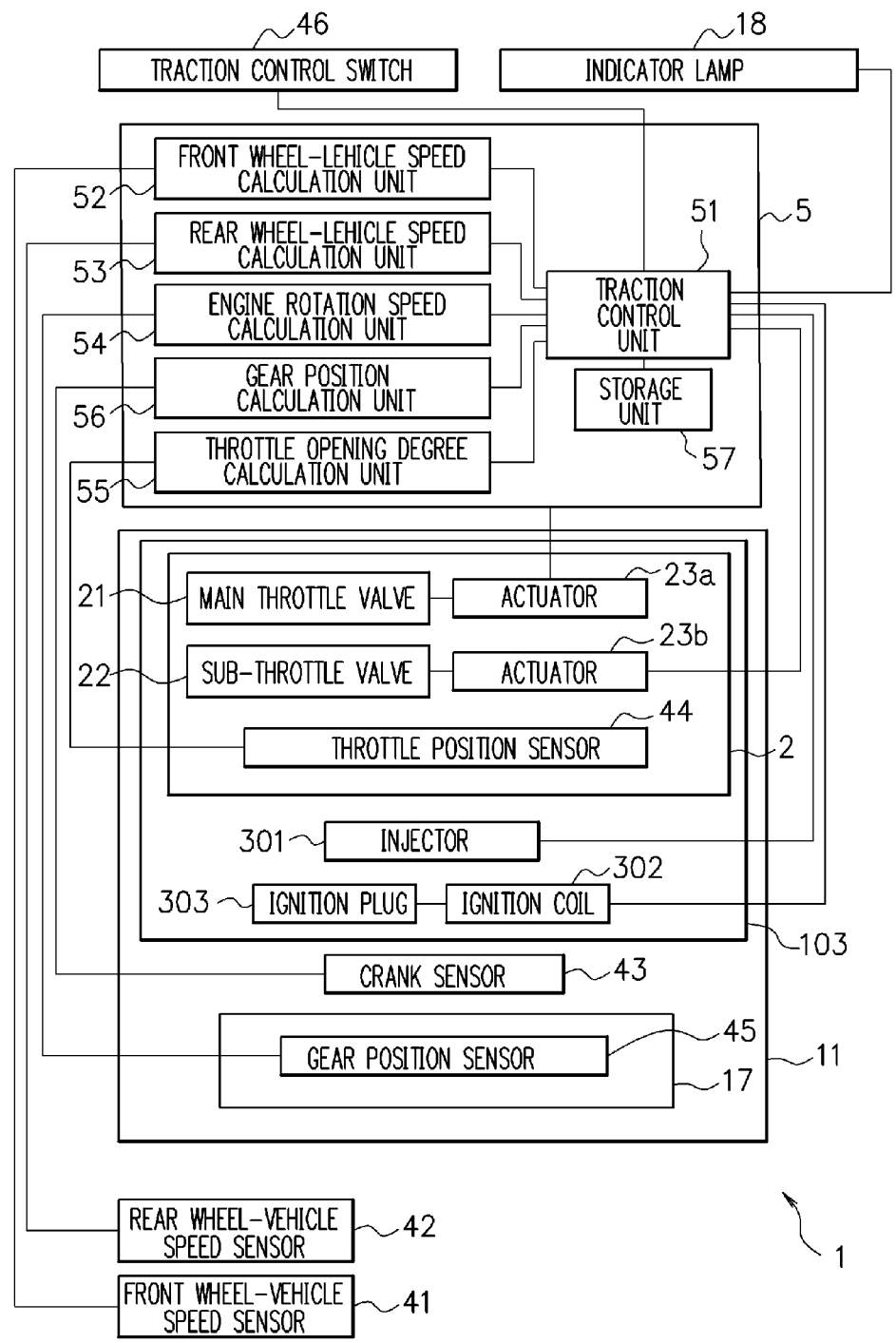
FIG. 2 is a block diagram schematically illustrating a configuration of a main part of a vehicle related to the embodiment of the present invention.

FIG. 1 is a schematic diagram illustrating an entire structure of a motorcycle related to the embodiment of the present invention. FIG. 2 is a block diagram illustrating a main part of the motorcycle related to the embodiment of the present invention. A motorcycle 1 includes an engine unit 11 (internal combustion engine) being a driving force source, a rear wheel 12 being a driving wheel, a front wheel 13 being a driven wheel, predetermined sensors for detecting states of respective parts, and an engine control unit (described as "ECU", hereinafter) controlling the engine unit 11. The present embodiment shows a configuration, as an example, in which an ECU 5 functions as a traction control device that performs a traction control.

As the engine unit 11, a multicylinder engine having a plurality of cylinders 103 is applied. The engine unit 11 has a cylinder assembly 101 and a crankcase assembly 102. In the cylinder assembly 101, the plurality of cylinders 103 are formed, and in each of the plurality of cylinders 103, a piston is housed in a manner that it can reciprocate. At a position close to the front of the crankcase assembly 102, a crankshaft is rotatably housed. At a position close to the rear of the crankcase assembly 102, a transmission 17 is provided.

Further, in the crankcase assembly 102, there is provided a clutch 19 that connects/disconnects a transmission of a driving force from the crankshaft to the transmission 17. Further, a driving force of the engine unit 11 is transmitted to the rear wheel 12 being the driving wheel via a drive chain 14. To the front wheel 13 being the driven wheel, the driving force of the engine unit 11 is not transmitted.

Further, the engine unit 11 has throttle bodies 2 which control an amount of air for combustion supplied to the respective cylinders 103, injectors 301 that mix a fuel into the air for combustion, and ignition coils 302 that supply high-tension electricity for ignition to ignition plugs 303 of the respective cylinders 103. The throttle body 2 has two valves being a main throttle valve 21 and a sub-throttle valve 22. The main throttle valve 21 and the sub-throttle valve 22 are driven by actuators 23a and 23b, respectively. Note that the throttle body 2, the injector 301, the ignition plug 303, and the ignition coil 302 are provided for each cylinder 103. Although only one of each of the components is illustrated in FIG. 2 for the sake of omission, actually, there are provided the components whose number corresponds to the number of the cylinders 103. Further, although this embodiment shows an example in which the main throttle valve 21 is driven by the actuator 23a, it is also possible to open/close the main throttle valve 21 by using a throttle wire that transmits an operating force of a driver. Further, in an example in which the main throttle valve 21 is driven by the actuator 23a, an intake control performed by a control of sub-throttle valve to be described later can also be conducted by the main throttle valve 21.

The motorcycle 1 has, as sensors (detection units) detecting states of the respective parts, a rear wheel-vehicle speed sensor 42, a front wheel-vehicle speed sensor 41, a crank sensor 43, a throttle position sensor 44, and a gear position sensor 45. The rear wheel-vehicle speed sensor 42 detects a rotation of the rear wheel 12. The front wheel-vehicle speed sensor 41 detects a rotation of the front wheel 13. The crank sensor 43 detects a rotation of the crankshaft of the engine unit 11. The throttle position sensor 44 detects an operation of the throttle body 2 (signals regarding opening degrees of the respective main throttle valve 21 and sub-throttle valve 22). The gear position sensor 45 detects a gear position (shift position) of the transmission 17. Detection results obtained by these sensors are transmitted to respective calculation units of the ECU 5.

Other than the above, the motorcycle 1 has a traction control switch 46, and an indicator lamp 18. The traction control switch 46 is a switch operated by a driver for switching ON/OFF of the traction control or switching a mode, and is provided on a handle 16, for example. The indicator lamp 18 is a lamp indicating a state of the traction control (ON/OFF or mode), and is provided on a meter unit 15, for example.

The ECU 5 controls the engine unit 11. The ECU 5 has a rear wheel-vehicle speed calculation unit 53, a front wheel-vehicle speed calculation unit 52, an engine rotation speed calculation unit 54, a throttle opening degree calculation unit 55, a gear position calculation unit 56, a storage unit 57, and a traction control unit 51. The rear wheel-vehicle speed calculation unit 53 calculates a rear wheel-vehicle speed from a detection result of the rear wheel-vehicle speed sensor 42. The front wheel-vehicle speed calculation unit 52 calculates a front wheel-vehicle speed from a detection result of the front wheel-vehicle speed sensor 41. The rear wheel-vehicle speed is set to indicate a vehicle speed of the motorcycle 1 calculated from a rotation speed and a diameter of the rear wheel 12. The front wheel-vehicle speed is set to indicate a vehicle speed of the motorcycle 1 calculated from a rotation speed and a diameter of the front wheel 13. The engine rotation speed calculation unit 54 calculates an engine speed from a detection result of the crank sensor 43. The engine speed calculated from the detection result of the crank sensor 43 is described as "actual measured rotation speed". The throttle opening degree calculation unit 55 calculates an opening degree of the throttle body 2 from a detection result of the throttle position sensor 44. The gear position calculation unit 56 calculates a gear position (shift position) from a detection result of the gear position sensor 45. The calculation results obtained by these respective calculation units are transmitted to the traction control unit 51. Further, a state of the traction control switch 46 is also transmitted to the traction control unit 51.

The storage unit 57 stores information used by the respective calculation units and the traction control unit 51 for performing the predetermined calculations and the traction control. The information stored in the storage unit 57 includes the diameter of the rear wheel 12, the diameter of the front wheel 13, a speed reduction ratio for each gear position of the transmission 17, and later-described maps and tables. The traction control unit 51 carries out the traction control by using the calculation results obtained by the respective calculation units, the state of the traction control switch 46, and the information stored in the storage unit 57.

The main throttle valve 21 of the throttle body 2 is opened/closed by the actuator 23a controlled by the ECU 5 in accordance with a throttle operation of the driver. In a normal control in which the traction control is not intervened, an optimum opening degree of the sub-throttle valve 22 is calculated by the ECU 5 in accordance with an engine speed, a gear position, and an opening degree of the main throttle valve 21. Note that the method of calculating the optimum opening degree of the sub-throttle valve 22 in the normal control is not particularly limited, and a conventional well-known calculation method can be applied.

(Outline of Traction Control)

The traction control unit 51 of the ECU 5 can perform a delay control and an intake control as the traction control of preventing or suppressing a spin of the rear wheel 12 being the driving wheel. The delay control corresponds to a control of reducing an output of the engine unit 11 by delaying an ignition timing of the ignition plug 303 of the engine unit 11. The intake control corresponds to a control of reducing the output of the engine unit 11 by throttling the opening degree of the sub-throttle valve 22.

The traction control unit 51 continuously calculates a spin rate during its operation. The spin rate indicates a value to be an index of a degree of spin (idle running) of the rear wheel 12, and it is meant that the larger the value, the larger the spin. Note that the traction control unit 51 switches the calculation method of the spin rate between a case where the motorcycle 1 is in a starting state and a case where the motorcycle 1 is in a traveling state. The "starting state" and the "traveling state" will be described later. Further, when the spin rate exceeds a predetermined threshold value, the traction control unit 51 determines, in accordance with a magnitude of a difference between the spin rate and the threshold value of the rate, a target value of an output reduction rate of the entire engine unit 11. The predetermined threshold value of the spin rate is described as "spin rate threshold value". The spin rate threshold value is previously specified in accordance with a rear wheel driving force. A value obtained by subtracting the spin rate threshold value from the spin rate is described as "search spin rate".

The target value of the output reduction rate (required output reduction rate) of the entire engine unit 11 is described as "total output reduction rate".

The traction control unit 51 starts the delay control in preference to the intake control. In the delay control, when the total output reduction rate is equal to or less than a predetermined value, a part of the cylinders 103 is selected from the plurality of cylinders 103, and the ignition timing of the selected cylinder 103 is delayed. On the other hand, when the total output reduction rate exceeds the predetermined value, the ignition timing of the remaining cylinders 103 is also delayed. Further, when a state in which a moving average of the total output reduction rate is equal to or greater than a predetermined specified value lasts for a predetermined period of time, the traction control unit 51 starts the intake control.

(Switching Control of Calculation Method of Spin Rate)

Figure 3:
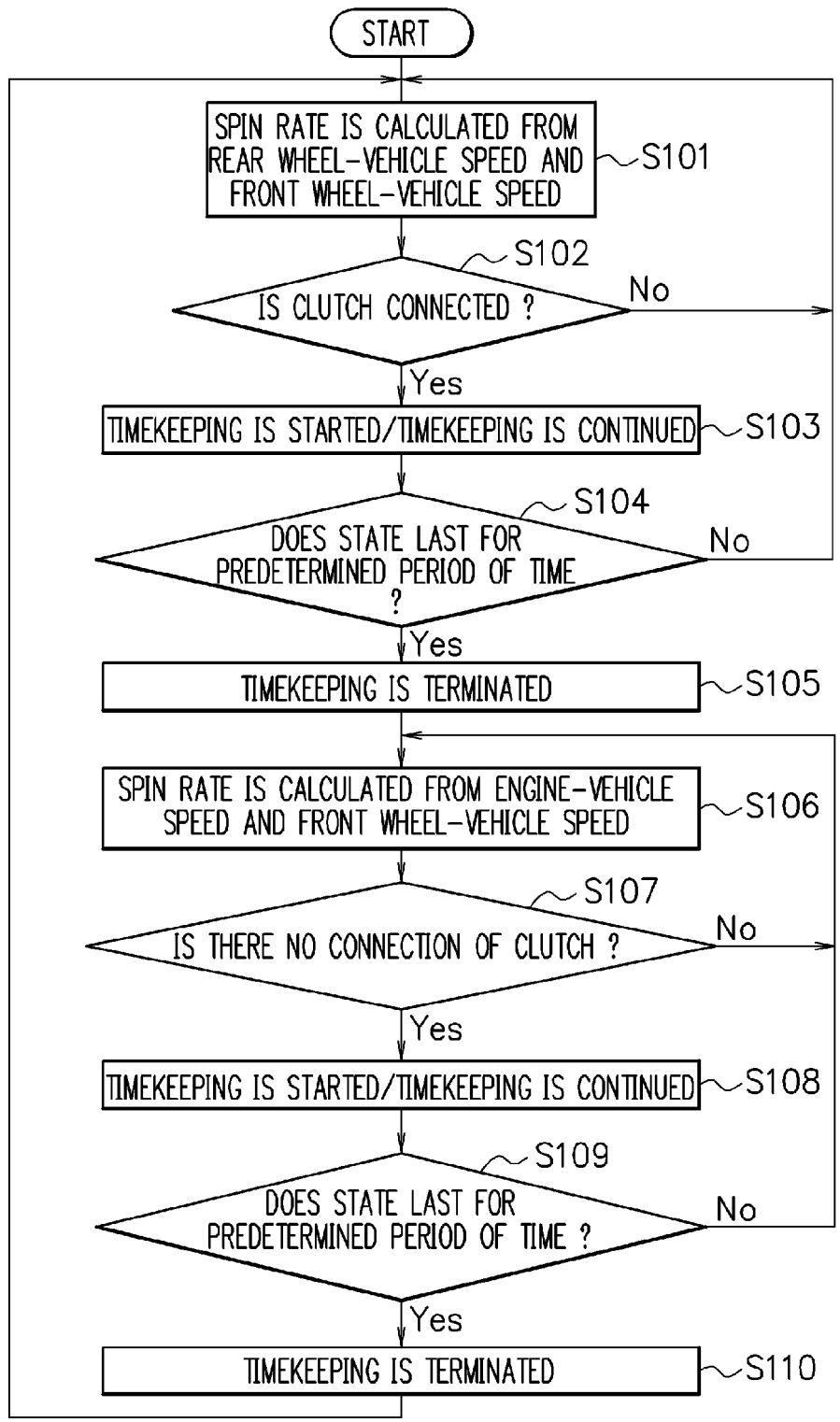
FIG. 3 is a flow chart regarding a control of switching a calculation method of a spin rate.

Description will be made on the control of switching the calculation method of the spin rate between the starting state and the traveling state. FIG. 3 is a flow chart of the control of switching the calculation method of the spin rate. Note that the "starting state" is set to indicate a state in which a state where the clutch 19 of the motorcycle 1 is not connected lasts for a predetermined period of time. The "traveling state" is set to indicate a state in which a state where the clutch 19 of the motorcycle 1 is connected lasts for a predetermined period of time. Here, a state of so-called "half-clutch" is set to be included in the state where the clutch 19 is not connected.

When the driver or the like operates an ignition switch to start the engine unit 11, and when the traction control switch 46 is set to be ON, the traction control unit 51 starts the traction control. The front wheel-vehicle speed calculation unit 52 calculates the front wheel-vehicle speed from the rotation (rotation speed) of the front wheel 13 detected by the front wheel-vehicle speed sensor 41 and the diameter of the front wheel 13. The rear wheel-vehicle speed calculation unit 53 calculates the rear wheel-vehicle speed from the rotation (rotation speed) of the rear wheel 12 detected by the rear wheel-vehicle speed sensor 42 and the diameter of the rear wheel 12. The engine rotation speed calculation unit 54 calculates the actual measured rotation speed from the detection result of the crank sensor 43. The gear position calculation unit 56 calculates the gear position from the detection result of the gear position sensor 45. The throttle opening degree calculation unit 55 calculates the opening degree of the throttle body 2 (opening degree of the main throttle valve 21) from the detection result of the throttle position sensor 44. Further, the respective calculation units continuously perform the above-described calculations during the operation of the ECU 5. The traction control unit 51 continuously obtains the calculation results provided by the respective units during its operation.

In step S101, the traction control unit 51 calculates the spin rate from the rear wheel-vehicle speed and the front wheel-vehicle speed by using the following mathematical expression (1) (first spin detection unit). Note that the traction control unit 51 calculates the spin rate by using the mathematical expression (1) also in an initial state right after the ECU 5 is activated.

$$(\text{spin rate}) = ((\text{rear wheel-vehicle speed}) - (\text{front wheel-vehicle speed})) / (\text{front wheel-vehicle speed}) \quad \text{Mathematical expression (1)}$$

Further, the process proceeds to step S106, and as long as the calculation method of the spin rate is not switched, the traction control unit 51 uses the spin rate calculated from the front wheel-vehicle speed and the rear wheel-vehicle speed for the traction control.

In steps S102 to S104, the traction control unit 51 determines whether or not the motorcycle 1 is in the traveling state. In the present embodiment, it is determined that the motorcycle 1 is in the traveling state if the state where the clutch 19 of the motorcycle 1 is connected lasts for the predetermined period of time.

First, in step S102, the traction control unit 51 determines whether or not the motorcycle 1 is in the traveling state.

Note that a moving average of the front wheel-vehicle speed is used as the front wheel-vehicle speed. Further, the moving average of the front wheel-vehicle speed is calculated by the front wheel-vehicle speed calculation unit 52 from the detection result of the rotation speed of the front wheel 13 provided by the front wheel-vehicle speed sensor 41. By using the moving average of the front wheel-vehicle speed for the determination, it is possible to increase an accuracy of the determination by eliminating an influence of a rapid variation and the like. Further, by using, not the rear wheel-vehicle speed, but the front wheel-vehicle speed, the vehicle speed can be determined without being influenced by the spin.

Here, the traction control unit 51 determines whether or not the clutch 19 is connected, by using a mathematical expression (2).

$$\text{(lower limit value of determination)} \leq \text{(averaged value of actual measured rotation speed)} \leq \text{(upper limit value of determination)} \quad \text{Mathematical expression (2)}$$

The lower limit value of determination and the upper limit value of determination in the mathematical expression (2) are calculated by using the following mathematical expressions (3) and (4).

$$\text{(lower limit value of determination)} = \text{(rear wheel-engine rotation speed)} - \text{(tolerance value)} \quad \text{Mathematical expression (3)}$$

$$\text{(upper limit value of determination)} = \text{(rear wheel-engine rotation speed)} + \text{(tolerance value)} \quad \text{Mathematical expression (4)}$$

The averaged value of the actual measured rotation speed in the mathematical expression (2) indicates an engine rotation speed as a result of eliminating the influence of rapid variation from the actual measured rotation speed. The rear wheel-engine rotation speed corresponds to an engine rotation speed calculated (calculated back) from the rear wheel-vehicle speed. Specifically, when the clutch 19 is connected, the rear wheel-vehicle speed is determined in accordance with an engine speed for each gear position. Therefore, the engine rotation speed can be calculated from the speed reduction ratio for each gear position (including a speed reduction ratio provided by a sprocket of drive chain), and the rotation speed of the rear wheel 12. Further, when the clutch 19 is connected, the averaged value of the actual measured rotation speed and the rear wheel-engine rotation speed take substantially the same value. Therefore, in the present embodiment, it is determined that the clutch 19 is connected when the averaged value of the actual measured rotation speed falls within a range of (rear wheel-engine rotation speed)±(tolerance value).

Note that since the actual measured engine rotation speed varies, if the actual measured engine rotation speed is directly used for this determination, there is a possibility of lowering an accuracy of the determination. Accordingly, the averaged value of the engine rotation speed is used in the mathematical expression (2). Consequently, it is possible to improve the determination accuracy. As the averaged value of the actual measured rotation speed, an average value of actual measured rotation speeds during a certain period can be employed. The averaged value of the actual measured rotation speed is calculated by the engine rotation speed calculation unit 54 based on the detection result provided by the crank sensor 43.

The rear wheel-engine rotation speed in the mathematical expressions (3) and (4) is calculated by using the following mathematical expression (5).

$$\text{(rear wheel-engine rotation speed)} = \text{(rear wheel-vehicle speed)} / \text{(calibrated vehicle speed)} \times \text{(calibrated rotation speed)} \quad \text{Mathematical expression (5)}$$

The calibrated rotation speed in the mathematical expression (5) is set to indicate a certain engine rotation speed. Although a concrete value of the calibrated rotation speed is not limited, a value of 1000 r.p.m can be employed, for example. The calibrated vehicle speed corresponds to a vehicle speed calculated from the speed reduction ratio for each gear position and the diameter of the rear wheel 12, when an actual engine rotation speed is the calibrated rotation speed and when the clutch 19 is connected. The calibrated vehicle speed and the calibrated rotation speed corresponding to the calibrated vehicle speed are previously stored in the storage unit 57. Further, the traction control unit 51 calculates the rear wheel-engine rotation speed from the rear wheel-vehicle speed calculated by the rear wheel-vehicle speed calculation unit 53, and the calibrated vehicle speed and the calibrated rotation speed stored in the storage unit 57.

The tolerance value in the mathematical expressions (3) and (4) is specified in accordance with the rear wheel-engine rotation speed. For example, a table for specifying the tolerance value is previously stored in the storage unit 57. This table is described as "tolerance value table". FIG. 4 is a schematic diagram illustrating an example of the tolerance value table. In the tolerance value table, tolerance values corresponding to the respective rear wheel-engine rotation speeds are specified. The traction control unit 51 interpolates the tolerance value specified in the tolerance value table, to thereby determine the tolerance value corresponding to the calculated rear wheel-engine rotation speed. Note that the tolerance value table illustrated in FIG. 4 is one example, and a concrete value of the tolerance value is not limited.

When the mathematical expression (2) is satisfied, the process proceeds to step S103. If the expression is not satisfied, the process returns to step S101.

In step S103, the traction control unit 51 starts timekeeping. If the timekeeping is already in the middle of execution, the timekeeping is continued as it is. Subsequently, the process proceeds to step S104.

In step S104, the traction control unit 51 determines whether or not the state in which the clutch 19 is connected lasts for the predetermined period of time, based on an elapsed time from the start of the timekeeping. If the state does not last for the predetermined period of time, the traction control unit 51 determines that the motorcycle 1 is not transited to the "traveling state". In this case, the process returns to step S101, and the traction control unit 51 continues to use the spin rate calculated from the front wheel-vehicle speed and the rear wheel-vehicle speed for the traction control. If the state lasts for the predetermined period of time, the traction control unit 51 determines that the motorcycle 1 is transited to the "traveling state". In this case, the process proceeds to step S105 in which the timekeeping is terminated, and subsequently, the process proceeds to step S106. Note that when a state in which the mathematical expression (2) is not satisfied is created during this timekeeping, the determination is made as "No" in step S102, and the timekeeping is reset.

In step S306, the traction control unit 51 switches the calculation method of the spin rate. Specifically, the traction control unit 51 calculates the spin rate from the front wheel-vehicle speed and an engine-vehicle speed by using the following mathematical expression (6) (second spin detection unit).

(spin rate)=((engine-vehicle speed)−(front wheel-vehicle speed))/(front wheel-vehicle speed)×100      Mathematical expression (6)

The engine-vehicle speed in the mathematical expression (6) corresponds to a vehicle speed of the motorcycle 1 calculated from the actual measured engine rotation speed. Specifically, the vehicle speed when the clutch 19 is connected can be calculated from the engine rotation speed, the speed reduction ratio for each gear position, and the diameter of the rear wheel 12. Accordingly, the traction control unit 51 calculates the engine-vehicle speed from the engine rotation speed, the speed reduction ratio, and the diameter of the rear wheel 12, in accordance with the gear position determined by the gear position calculation unit 56.

Note that it is also possible that the traction control unit 51 calculates the spin rate by using the following mathematical expression (7).

(spin rate)=((actual measured rotation speed)−(front wheel-engine rotation speed))/(front wheel-engine rotation speed)×100      Mathematical expression (7)

The "front wheel-engine rotation speed" corresponds to an engine rotation speed calculated from the front wheel-vehicle speed, the speed reduction ratio for each gear position, and the diameter of the rear wheel 12. Specifically, the front wheel-vehicle speed when the spin of the rear wheel 12 does not occur in the state where the clutch 19 is connected, is determined by the engine rotation speed, the speed reduction ratio for each gear position, and the diameter of the rear wheel 12. For this reason, the engine rotation speed when the spin does not occur can be calculated (calculated back) from the speed reduction ratio at the gear position and the front wheel-vehicle speed. The traction control unit 51 calculates (calculates back) the engine rotation speed when the spin does not occur, based on the front wheel-vehicle speed, the gear position determined by the gear position calculation unit 56, and the diameter of the rear wheel 12.

Subsequently, during a period in which the motorcycle 1 is in the "traveling state", the traction control unit 51 performs the traction control by using the spin rate calculated by using the mathematical expression (6) or the mathematical expression (7).

In steps S107 to S109, the traction control unit 51 determines whether or not the motorcycle 1 is transited to the "starting state". Concretely, the determination is conducted in the following manner.

In step S107, the traction control unit 51 determines whether or not one of a mathematical expression (8) and a mathematical expression (9) satisfied when the clutch 19 is not connected, is satisfied.

lower limit value of determination>actual measured rotation speed      Mathematical expression (8)

upper limit value of determination<actual measured rotation speed      Mathematical expression (9)

When one of the mathematical expressions (8) and (9) is satisfied, the traction control unit 51 determines that a state where the clutch 19 of the motorcycle 1 is not connected is created. In this case, the process proceeds to step S108. Otherwise, the traction control unit 51 determines that the motorcycle 1 is in the traveling state. In this case, the process returns to step S106.

In step S108, the traction control unit 51 starts timekeeping. If the timekeeping is already in the middle of execution, the timekeeping is continued as it is. Subsequently, the process proceeds to step S109. Note that when a state in which the mathematical expression (8) or the mathematical expression (9) is not satisfied is created during this timekeeping, the determination is made as "No" in step S107, and the timekeeping is reset.

In step S109, the traction control unit 51 determines whether or not the state in which one of the mathematical expression (8) and the mathematical expression (9) is satisfied lasts for a predetermined period of time. If the state does not last for the predetermined period of time, the traction control unit 51 determines that the motorcycle 1 is continuously in the "traveling state". In this case, the process returns to step S106, and the traction control unit 51 performs the traction control by using the spin rate calculated from the mathematical expression (6) or the mathematical expression (7). On the other hand, if the state lasts for the predetermined period of time, the traction control unit 51 determines that the motorcycle 1 is transited to the "starting state". In this case, the process proceeds to step S110 in which the timekeeping is terminated, and then the process returns to step S101. Further, the traction control unit 51 switches the calculation method of the spin rate to the method of using the mathematical expression (1).

As above, the traction control unit 51 continues the processing illustrated in FIG. 3 from when the engine unit 11 is activated to when the engine unit 11 is stopped. Further, the traction control unit 51 switches the calculation method of the spin rate (spin detection unit) in accordance with whether the motorcycle 1 is in the starting state or the traveling state. Specifically, the calculation method of the spin rate (spin detection unit) is switched in accordance with the connection state of the clutch.

Figure 5:
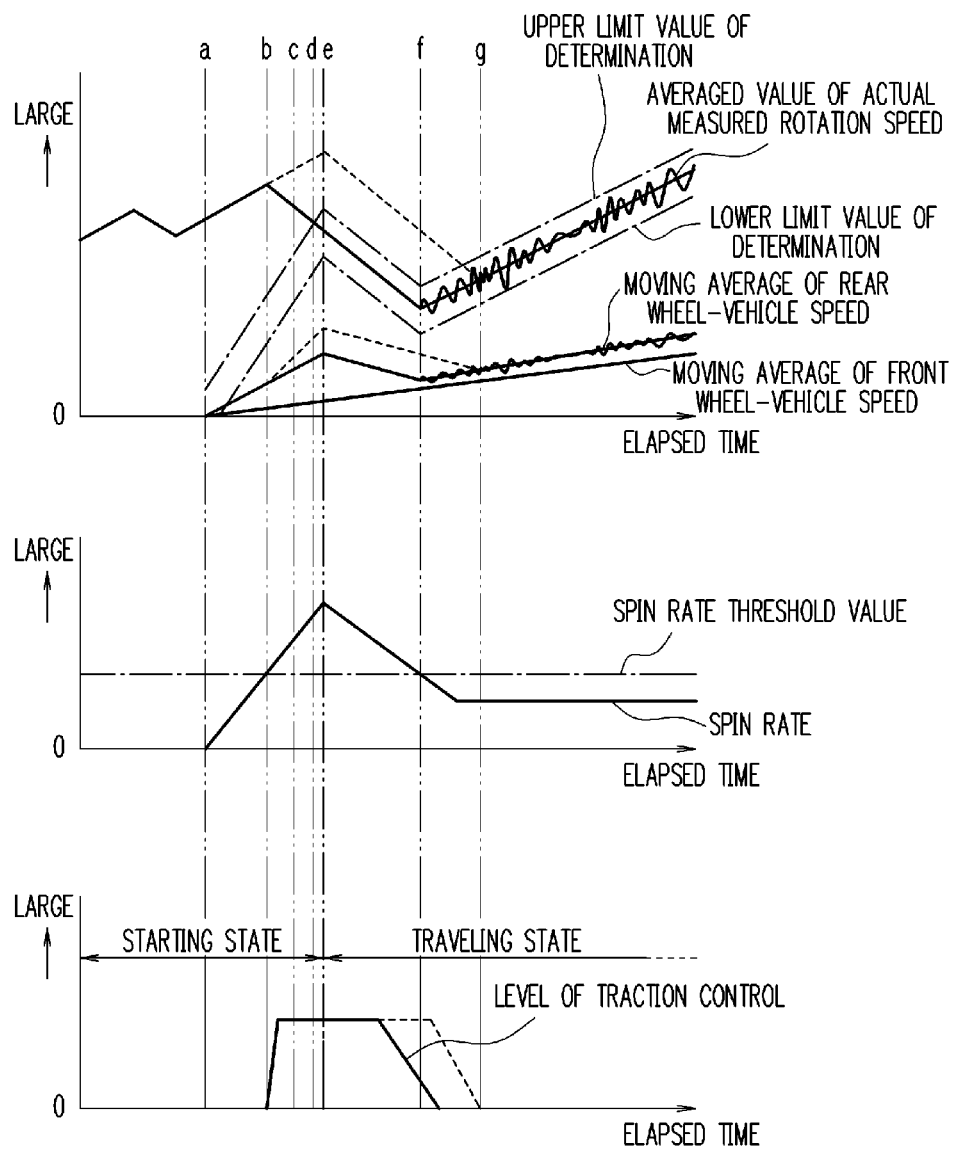
FIG. 5 is a schematic diagram illustrating an example of transition of a state of the motorcycle.

Here, an example of transition of the state of the motorcycle 1 will be described while referring to FIG. 5. FIG. 5 is a schematic diagram illustrating the example of transition of the state of the motorcycle 1.

A timing a is a timing at which the motorcycle 1 starts moving. At the timing a and thereafter, the front wheel-vehicle speed and the rear wheel-vehicle speed increase. The lower limit value of determination and the upper limit value of determination are calculated from the rear wheel-engine rotation speed, so that they change in accordance with the rear wheel-engine rotation speed (rear wheel-vehicle speed). Further, the traction control unit 51 calculates, at the time of the start, the spin rate from the front wheel-vehicle speed and the rear wheel-vehicle speed (step S101, first spin detection unit). For this reason, if the rear wheel 12 spins when the motorcycle 1 is in the starting state, a difference is generated between the front wheel-vehicle speed and the rear wheel-vehicle speed. Further, if this difference becomes large, the spin rate also becomes large, resulting in that the spin rate sometimes exceeds the spin rate threshold value.

A timing b indicates a timing at which the spin rate exceeds the spin rate threshold value. When the spin rate exceeds the spin rate threshold value, the search spin rate becomes to have a certain value. Consequently, the traction control unit 51 calculates the total output reduction rate in accordance with the search spin rate, and performs the delay control and the intake control by setting the calculated total output reduction rate as the target value, thereby reducing the output of the engine unit 11. At this time, the traction control unit 51 starts the delay control in preference to the intake control (which will be described later).

A timing c indicates a state after the spin rate exceeds the spin rate threshold value. However, at the timing c, the averaged value of the actual measured rotation speed is not between the lower limit value of determination and the upper limit value of determination. For this reason, the traction control unit 51 uses the spin rate calculated from the front wheel-vehicle speed and the rear wheel-vehicle speed for the traction control ("No" in step S102).

A timing d indicates a timing at which the averaged value of the actual measured rotation speed falls within the predetermined range (between the lower limit value of determination and the upper limit value of determination). At this timing d, the aforementioned mathematical expression (2) is satisfied ("Yes" in step S102). Accordingly, the traction control unit 51 starts the timekeeping (step S103).

A timing e indicates a timing at which a predetermined period of time elapses after the averaged value of the actual measured rotation speed falls within the predetermined range ("Yes" in step S104). At the timing e, the traction control unit 51 determines that the motorcycle 1 is transited to the traveling state (the clutch 19 is connected). Subsequently, the traction control unit 51 switches the calculation method of the spin rate to the method of calculating the spin rate from the engine-vehicle speed and the front wheel-vehicle speed (step S106, the second spin detection unit).

A timing f indicates a timing at which the spin of the rear wheel 12 is reduced by the delay control and the intake control of the sub-throttle valve 22, and the spin rate becomes equal to or less than the spin rate threshold value.

According to the present embodiment, in the state where the clutch 19 is not connected, the traction control is conducted by calculating the spin rate from the rear wheel-vehicle speed and the front wheel-vehicle speed. Accordingly, the traction control can be carried out, without being influenced by the state of the clutch 19, from a point of time at which the motorcycle 1 starts moving without waiting for the completion of connection of the clutch 19. For example, in the configuration in which the spin rate is calculated from the engine-vehicle speed and the front wheel-vehicle speed, the output reduction of the engine unit 11 is finally started at the timing at which the motorcycle 1 is transited to the traveling state (timing e in FIG. 5). Note that a dash line in FIG. 5 indicates a transition of state in the control of using only the method of calculating the spin rate from the engine-vehicle speed and the front wheel-vehicle speed, as a comparative example. As above, in the configuration of the comparative example, the spin of the rear wheel 12 is not suppressed up to the timing e, and the spin of the rear wheel 12 is finally suppressed at a timing g later than the timing f.

Further, when the motorcycle 1 is transited to the traveling state, the method is switched to the method of calculating the spin rate from the engine-vehicle speed and the front wheel-vehicle speed. According to the method as above, it is possible to carry out a fine traction control with quick response capable of quickly dealing with the variation of the actual engine rotation speed. A thin line in FIG. 5 indicates an example of transition of the actual engine rotation speed and the rear wheel-vehicle speed when the averaging processing in the control of using only the spin rate calculated from the actual measured rotation speed and the front wheel-engine rotation speed, is not conducted. In the method of calculating the spin rate from the rear wheel-vehicle speed, since a certain period of time is required until when the variation of the engine rotation speed is transmitted to the rear wheel 12, it is not possible to quickly follow the variation of the actual engine rotation speed. For this reason, since it is not possible to quickly suppress the increase in the engine rotation speed, the behavior of vehicle body becomes large. On the contrary, such problems can be solved in the present embodiment. As above, according to the present embodiment, it is possible to conduct the fine control in which the spin of the rear wheel 12 can be suppressed from the starting, and at the time of the traveling, the variation of the engine speed is suppressed.

Further, according to the present embodiment, even when the gear position sensor 45 erroneously detects the gear position during the traveling, it is possible to prevent the behavior of the motorcycle 1 from being unstable. For example, if a foreign substance is interposed at a contact of the gear position sensor 45, a resistance value of the sensor changes, which may lead to the erroneous detection of the gear position. Further, if the gear position sensor 45 erroneously detects the gear position under the traveling state, the calibrated vehicle speed, the front wheel-engine rotation speed, and the calculation result of the spin rate change. Consequently, there is a possibility that the actual measured rotation speed calculated from the detection result of the crank sensor 43, and the upper limit value of determination and the lower limit value of determination specified by the rear wheel-engine rotation speed are deviated. As a result of this, the traction control unit 51 determines that the motorcycle 1 is transited from the traveling state to the starting state, and performs the traction control by using the spin rate calculated from the rear wheel-vehicle speed and the front wheel-vehicle speed. As above, with the use of the configuration of switching the expression of calculation of the spin rate, it is possible to make the traction control unit 51 have a fail-safe function.

(Calculation of Total Output Reduction Rate)

Next, description will be made on the calculation of the total output reduction rate. The traction control unit 51 calculates the search spin rate in accordance with the rear wheel driving force and the calculated spin rate, and calculates the total output reduction rate in accordance with the calculated search spin rate.

Figure 6:
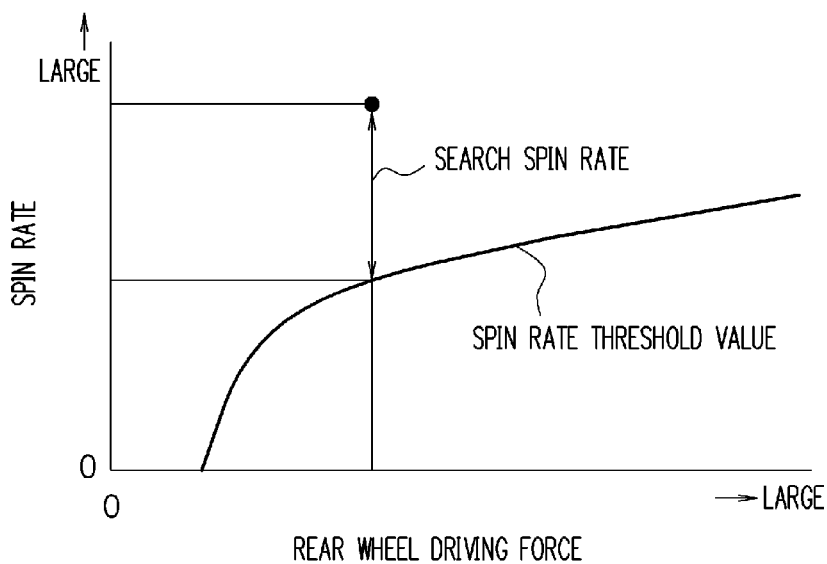
FIG. 6 is a schematic diagram illustrating, in a graph, an example of a search spin rate map used for calculating a search spin rate.

FIG. 6 is a schematic diagram illustrating, in a graph, an example of map used for calculating the search spin rate. This map is described as "search spin rate map". In the storage unit 57, the search spin rate map is previously stored for each gear position. Further, at the time of calculating the search spin rate, the traction control unit 51 reads and uses the search spin rate map corresponding to the gear position. As illustrated in FIG. 6, the search spin rate map specifies a relationship between the rear wheel driving force and the spin rate threshold value. The spin rate threshold value is set to indicate a tolerable spin rate. Specifically, even in a case where the rear wheel 12 spins, if the spin rate is equal to or less than the spin rate threshold value, the traction control unit 51 does not reduce the output of the engine unit 11. The spin rate threshold value is set to be larger as the rear wheel driving force is increased, as illustrated in FIG. 6, for example. However, the spin rate threshold value illustrated in FIG. 6 is one example, and concrete values and characteristics are not particularly limited. The rear wheel driving force can be calculated from the opening degree of the throttle body 2 calculated by the throttle opening degree calculation unit 55 from the detection result of the throttle position sensor 44, the engine speed and the gear position.

The traction control unit 51 uses the search spin rate map, and calculates the search spin rate from the rear wheel driving force and the calculated spin rate. Concretely, the traction control unit 51 calculates the search spin rate by using the following mathematical expression (10) in accordance with the rear wheel driving force.

(search spin rate)=(spin rate)−(spin rate threshold value)   Mathematical expression (10)

As described above, if the motorcycle 1 is in the traveling state, the traction control unit 51 calculates the spin rate from the engine-vehicle speed and the front wheel-vehicle speed. Note that in the above-described example, the spin rate is calculated by comparing the engine-vehicle speed (the rear wheel-vehicle speed converted from the engine speed) and the front wheel-vehicle speed, namely, by comparing the vehicle speeds, but, it is also possible to configure such that the spin rate is calculated by comparing the actual measured rotation speed (actual engine rotation speed) and the front wheel-engine rotation speed (the engine rotation speed converted from the rotation of the rear wheel whose vehicle speed becomes the same as the front wheel-vehicle speed), namely, by comparing the engine speeds. Further, if the motorcycle 1 is in the starting state, the traction control unit 51 calculates the spin rate from the rear wheel-vehicle speed and the front wheel-vehicle speed.

Figure 7:
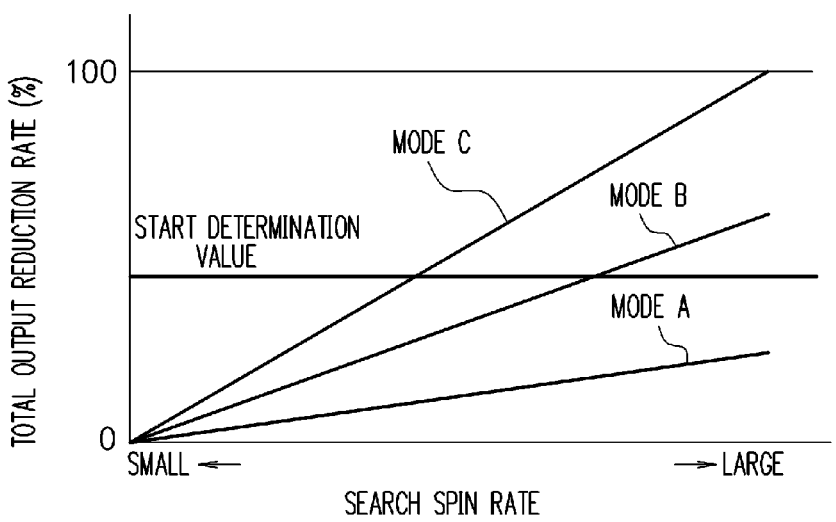
FIG. 7 is a schematic diagram illustrating, in a graph, an example of a total output reduction rate map for calculating a total output reduction rate.

FIG. 7 is a schematic diagram illustrating, in a graph, an example of map for calculating the total output reduction rate. This map is described as "total output reduction rate map". The total output reduction rate map specifies the total output reduction rate in accordance with the search spin rate. For example, the map specifies that the total output reduction rate becomes larger as the search spin rate is increased. Further, as illustrated in FIG. 7, the traction control unit 51 has a plurality of total output reduction rate maps for respective modes having mutually different characteristics. FIG. 7 illustrates an example of mutually different three modes A to C. The mode A is a mode providing the weakest effect of the traction control. The mode C is a mode providing the strongest effect of the traction control. The mode B is a mode whose effect is at a level in the middle of the mode A and the mode C. The driver can select an arbitrary mode out of the plurality of modes A to C, by operating the traction control switch 46. Further, the traction control unit 51 uses the total output reduction rate map of the selected mode in accordance with the selection operation of the traction control switch 46 made by the driver.

If the configuration as above is employed, the driver can select the strong and weak of the effect of the traction control. For example, when the driver allows a certain degree of spin (when the spin of the rear wheel 12 is intentionally caused) for the purpose of traveling fast, he/she is only required to select the mode A. In the mode A, the total output reduction rate is suppressed to be a low rate, and an inclination of the graph of the mode A is small, so that even if the search spin rate becomes large, the degree of suppression of the spin is small since the increase in the total output reduction rate is suppressed to be small. Further, in a case where the driver wants to give preference to the prevention or suppression of the spin of the rear wheel 12, the driver is only required to select the mode C. In the mode C, the total output reduction rate is set to a rate higher than that of the mode A and the mode B, and the inclination of the graph of the mode C is large, resulting in that the total output reduction rate is greatly increased as the search spin rate is increased. For this reason, the effect of suppressing the spin of the rear wheel 12 becomes large. Further, the driver is only required to select the mode B under normal conditions.

Note that in the example of the "total output reduction rate map", the search spin rate and the total output reduction rate are in a proportional relationship, but, the example is not limited to this, and it is also possible to set such that the mode is divided only when the search spin rate is large, or the inclination of the graph is changed in accordance with the magnitude of the search spin rate.

Note that although the search spin rate map is prepared for each gear position, a common map is prepared, as the total output reduction rate map, for all of the gear positions, regardless of the gear positions. Consequently, it is possible to suppress an increase in the number of maps stored in the storage unit 57. Further, "start determination value" in FIG. 7 corresponds to a value to be a reference for starting the intake control, in the traction control. The start determination value will be described later.

(Delay Control)

The traction control unit 51 starts the delay control by setting the total output reduction rate (required output reduction rate) determined as above, as a target value, thereby reducing the output of the engine unit 11. As a method of reducing the output, the intake control and the delay control are conducted in the present embodiment, and the traction control unit 51 starts the delay control in preference to the intake control. In the present embodiment, whether the ignition timing of a part of the cylinders 103, out of the plurality of cylinders 103, is delayed, or the ignition timing of all of the cylinders 103 is delayed, is switched in accordance with the value of the total output reduction rate being the output reduction rate required to prevent or suppress the spin.

A proportion of the cylinders 103 whose ignition timing is delayed, out of the plurality of cylinders 103, is previously determined. This proportion is described as "thinning-out rate". For example, when the engine unit 11 is a four-cylinder engine, and the thinning-out rate is set to 50%, an ignition timing of two cylinders (=four cylinders×50%) is delayed for each one cycle, on average. Further, in the present embodiment, the cylinder 103 whose ignition timing is delayed is changed for each one cycle.

The thinning-out rate is fixed to a previously set value in accordance with a specification and the like of the engine unit 11, and the rate is not changed. The maximum output reduction rate capable of being realized by the delay of the ignition timing of a part of the cylinders 103 is determined by the thinning-out rate. Specifically, if the output reduction rate of the cylinder 103 to be a target of the delay of the ignition timing is set to 100% (maximum delay state) when the thinning-out rate is 50%, the maximum output reduction rate obtained by the delay realized by the entire engine unit 11 becomes 50%. For this reason, if the configuration in which the thinning-out rate is fixed to 50% is employed, the maximum value of the output reduction rate becomes 50%, and if no measure is taken, a control capable range for reducing the output, becomes small. Therefore, in the present embodiment, when (total output reduction rate)≤(thinning-out rate) is satisfied, the ignition timing is delayed with respect to the cylinders 103 whose number is determined in accordance with the thinning-out rate, and when (total output reduction rate)>(thinning-out rate) is satisfied, the ignition timing is delayed with respect to the remaining cylinders 103 as well. The concrete processing is as follows.

(a) When (total output reduction rate)≤(thinning-out rate) is satisfied

FIG. 8 is a matrix table used for selecting the cylinders 103 whose ignition timing is delayed. For convenience of explanation, this matrix table is described as "thinning-out table". As illustrated in FIG. 8, an item in the horizontal direction and an item in the vertical direction of the thinning-out table indicate the cylinder 103 and a cycle, respectively. Further, to respective grids, numeric values of 0.0 to 100.0 are randomly assigned. Specifically, the random numeric values are assigned to the respective cylinders along a plurality of cycles. This thinning-out table is previously stored in the storage unit 57. The traction control unit 51 reads the thinning-out table, and uses the table for selecting the cylinder 103 whose ignition timing is delayed. Here, explanation will be made by assuming that the engine unit 11 is a four-cylinder engine, and the thinning-out rate is 50%. The traction control unit 51 selects, based on the numeric value assigned to each grid of the thinning-out table, the grid in which the numeric value is equal to or less than the thinning-out rate (%). If the thinning-out rate is 50%, the grid to which the numeric value equal to or less than 50.0 is assigned is selected. In FIG. 8, the grid in which the numeric value written in white on a black background is described indicates the grid to which the numeric value equal to or less than the thinning-out rate is assigned. Further, the traction control unit 51 delays the ignition timing of each of the cylinders 103, in the cycle corresponding to the grid to which the numeric value equal to or less than the thinning-out rate is assigned. Here, the cylinder 103 selected based on the thinning-out table and on which the delay control is performed, is described as "selected cylinder". For example, in the first cycle, a cylinder #1 and a cylinder #2 correspond to the selected cylinders. In the second cycle, the cylinder #1 and a cylinder #3 correspond to the selected cylinders. As above, the traction control unit 51 uses the thinning-out table, and changes the selected cylinder for each one cycle. Note that in FIG. 8, an example in which the random numeric values are assigned up to when the cycle reaches the twentieth cycle, but, the number of cycles is not limited. Further, when the cycle reaches the twentieth cycle, the traction control unit 51 is only required to return to the first cycle again to change the selected cylinder.

As described above, the numeric values of 0.0 to 100.0 are randomly assigned to the respective grids, so that the grids to which the numeric value of equal to or less than 50.0 is assigned occupy about 50% of the entire thinning-out table. For this reason, the delay control can be performed on the 50% of the cylinders 103 as a whole. Further, with the use of such a configuration, by appropriately setting the thinning-out rate, it is possible to set the proportion of the selected cylinders.

The traction control unit 51 calculates the output reduction rate of the selected cylinder by using the following mathematical expression (11). The output reduction rate of each of the cylinders 103 obtained by the delay control is described as "output reduction rate by delay".

(output reduction rate by delay of selected cylinder)= (total output reduction rate)/(thinning-out rate)×100      Mathematical expression (11)

For example, when the total output reduction rate is 25%, the output reduction rate by delay of the selected cylinder becomes 50% (=25(%)/50(%)×100). When the total output reduction rate is 50%, the output reduction rate by delay of the selected cylinder becomes 100% (maximum delay state). This case means that the selected cylinder has to be set to the maximum delay state. The traction control unit 51 reduces the output of the engine unit 11 while changing the selected cylinder for each one cycle, in accordance with the thinning-out table.

The method of reducing the output of the selected cylinder is as follows. The storage unit 57 previously stores a map for determining the delay amount, for each output reduction rate by delay. The map is described as "delay amount map". For example, the storage unit 57 previously stores ten types of delay amount maps in which the output reduction rate by delay is shown, in increments of 10%, within a range of 10 to 100%. In each of the delay amount maps, an adaptation value of delay amount for realizing the output reduction rate by delay, is specified in accordance with the engine rotation speed and the throttle opening degree. Note that as the adaptation value of delay amount, a value previously measured by using a dynamo bench or the like is used, for example. The traction control unit 51 uses the delay amount map corresponding to the calculated output reduction rate by delay, and determines the delay amount of the selected cylinder from the actual measured rotation speed calculated by the engine rotation speed calculation unit 54, and the throttle opening degree calculated by the throttle opening degree calculation unit 55. Further, the traction control unit 51 controls the ignition coil 302 so that the ignition plug 303 of the selected cylinder performs ignition with the determined delay amount. Consequently, the output of the selected cylinder can be reduced in accordance with the determined output reduction rate by delay.

(b) When (total output reduction rate)>(thinning-out rate) is satisfied

In this case, even if all of the selected cylinders are set to be in the maximum delay state, the total output reduction rate cannot be realized. Accordingly, in this case, the output reduction rate by delay of the selected cylinder is set to 100% (maximum delay state), and the ignition timing is delayed with respect to the remaining cylinders 103 as well. The remaining cylinder 103 (the cylinder 103 other than the selected cylinder) is described as "non-selected cylinder". The traction control unit 51 calculates an output reduction rate by delay of the non-selected cylinder by using the following mathematical expression (12).

(output reduction rate by delay of non-selected cylinder)=((total output reduction rate)−(output reduction rate by delay of selected cylinder)×(thinning-out rate)/100)/(100−thinning-out rate)×100      Mathematical expression (12)

Note that if the output reduction rate by delay of the selected cylinder is 100%, the mathematical expression (12) becomes as follows.

(output reduction rate by delay of non-selected cylinder)=((total output reduction rate)−(thinning-out rate))/(100−(thinning-out rate))×100      Mathematical expression (13)

For example, when the required total output reduction rate is 75%, and the thinning-out rate is 50%, the output reduction rate by delay of the non-selected cylinder becomes 50%. Accordingly, in this case, the traction control unit 51 sets the output reduction rate by delay of the selected cylinder to 100%, and sets the output reduction rate by delay of the non-selected cylinder to 50%. Accordingly, 75% being the total output reduction rate is realized. Note that the method of determining the delay amount of the non-selected cylinder is similar to that of the selected cylinder.

With the use of the configuration of using the thinning-out table as described above, it is possible not to create a bias in the selection in the cylinders 103 to be the targets of the delay control, at any thinning-out rate. For example, when the thinning-out rate is fixed to 30%, the respective cylinders 103 become the targets of the delay control as the selected cylinders, in a cycle to which the numeric value equal to or less than 30.0 is assigned. Further, even if the thinning-out rate is a fraction such as 37% and 8%, by using this thinning-out table, the delay control can be carried out without generating the bias in the selection in the selected cylinders. Further, since it is possible to set the thinning-out rate in accordance with the specification of the engine unit 11, a sufficient recovery of grip can be performed in the traction control. Further, by increasing the thinning-out rate, it is also possible to deal with the traveling on a road surface with a low friction coefficient.

(Intake Control of Sub-Throttle Valve)

If the friction coefficient of the road surface is low, the spin of the driving wheel easily occurs, and as a result of this, the calculated total output reduction rate becomes large, and the delay amount in the delay control is increased. Further, when the delay amount is increased, a backfire and an after-burn are caused, and an exhaust-gas temperature is increased. If such a state lasts for a long period of time, there is generated a possibility that a catalyst temperature is increased to damage the catalyst. Accordingly, in the present embodiment, the start determination value is specified as a total output reduction rate at which the risk of the damage of catalyst becomes high (refer to FIG. 7). Note that a concrete value of the start determination value is appropriately specified in accordance with the specification and the like of the engine unit 11, and is not limited. When a state in which the total output reduction rate is equal to or greater than the start determination value lasts for a predetermined period of time, the traction control unit 51 performs the intake control of throttling the opening degree of the sub-throttle valve 22, thereby reducing the output of the engine unit 11. Note that the opening degree of the sub-throttle valve 22 is calculated by the ECU 5 in accordance with the engine speed, the gear position, and the opening degree of the main throttle valve 21, in the normal control (which refers to a state where the output reduction by the traction control is not conducted). Further, when the above-described condition is satisfied, the traction control unit 51 intervenes in the normal control, and performs the intake control of the sub-throttle valve 22.

Figure 9:
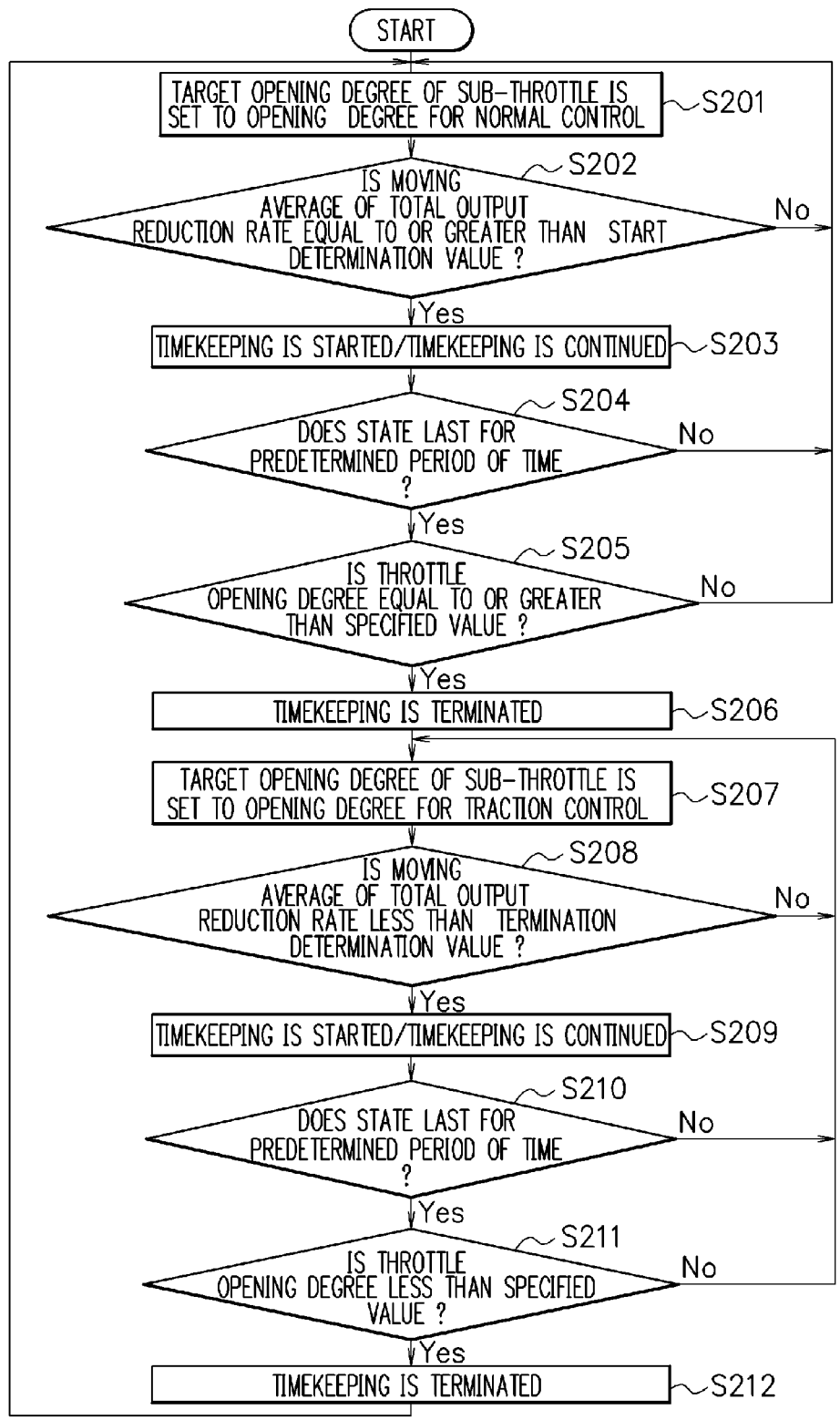
FIG. 9 is a flow chart illustrating an intake control of a sub-throttle valve.

The intake control of the sub-throttle valve 22 will be described while referring to FIG. 9. FIG. 9 is a flow chart illustrating the intake control of the sub-throttle valve 22.

In step S201, a throttle body control unit (illustration is omitted) of the ECU 5 sets a target opening degree of the sub-throttle valve 22 to an opening degree for the normal control, and performs control to make an actual opening degree to be the target opening degree.

In steps S202 to S204, the traction control unit 51 determines whether or not a state where a moving average of the total output reduction rate becomes equal to or greater than the start determination value lasts for a predetermined period of time or longer. First, in step S202, the traction control unit 51 determines whether or not the moving average of the total output reduction rate becomes equal to or greater than the start determination value. When the moving average of the total output reduction rate is less than the start determination value, the process returns to step S201. When the moving average of the total output reduction rate becomes equal to or greater than the start determination value, the process proceeds to step S203. In step S203, the traction control unit 51 starts timekeeping. If the timekeeping is already in the middle of execution, the timekeeping is continued. In step S204, it is determined whether or not the state where the moving average of the total output reduction rate becomes equal to or greater than the start determination value lasts for the predetermined period of time, based on an elapsed time from the start of the timekeeping. If the state does not last for the predetermined period of time, the process returns to step S201. In this case, a state where the sub-throttle valve 22 is controlled by the throttle body control unit of the ECU 5 lasts. If the state where the moving average of the total output reduction rate becomes equal to or greater than the start determination value lasts for the predetermined period of time, the process proceeds to step S205. Note that when the moving average of the total output reduction rate does not become equal to or greater than the start determination value in step S202 during the timekeeping, the timekeeping is reset, and the process returns to step S201. Further, during this timekeeping, although the intake control of the sub-throttle valve 22 is not conducted, the delay control is conducted. Although the intake control using the sub-throttle valve 22 has an effect larger than that of the delay control, regarding the output reduction, the intake control tends to be late due to a bad response thereof, so that the delay control capable of performing a control with good response and an accurate control, is designed to be performed at first.

In step S205, the traction control unit 51 determines whether or not the throttle opening degree is equal to or greater than a predetermined specified value. The predetermined specified value is appropriately set, and is not particularly limited. The point is, when the throttle opening degree is small to some extent at a point of time at which the process proceeds to S205, the opening degree of the sub-throttle valve 22 is not throttled in the intake control. When the throttle opening degree is not equal to or greater than the predetermined specified value, the process returns to step S201. Specifically, it is judged that the driver returns the throttle with respect to the occurred spin, and the spin may be terminated without performing the intake control using the sub-throttle valve 22, so that the timekeeping is reset and the process returns to step S201. Accordingly, it is possible to prevent an occurrence of situation where the sub-throttle valve 22 whose movement is relatively slow is operated, resulting in that it takes time to cancel the output reduction control, and a problem and an uncomfortable feeling are generated in an acceleration thereafter. Note that when the throttle opening degree is equal to or greater than the specified value in which a further reduction in the output may become necessary, the process proceeds to step S206 in which the timekeeping is terminated, and subsequently, the process proceeds to step S207.

In step S207, the traction control unit 51 sets the target opening degree of the sub-throttle valve 22 to the target opening degree for the traction control. Further, the traction control unit 51 intervenes in the control of the throttle body control unit of the ECU 5, and controls the opening degree of the sub-throttle valve 22 to make the opening degree to be the set target opening degree. Further, during a period of time in which the process returns to step S201 again from step S207, the traction control unit 51 sets the opening degree of the sub-throttle valve to a closing side, with respect to the opening degree for the normal control to throttle an intake passage, thereby reducing the output of the engine unit 11.

Note that in the storage unit 57, a map for setting the target opening degree for the traction control in the intake control of the sub-throttle valve 22 is previously stored. This map is described as "target opening degree map". For example, in the target opening degree map, the target opening degree in accordance with the engine rotation speed and the throttle opening degree is specified. The traction control unit 51 reads the target opening degree map from the storage unit 57, and determines the target opening degree in accordance with the actual measured rotation speed calculated by the engine rotation speed calculation unit 54 and the throttle opening degree calculated by the throttle opening degree calculation unit 55.

In step S208, the traction control unit 51 determines whether or not the moving average of the total output reduction rate becomes equal to or less than a termination determination value. The termination determination value corresponds to a value of the total output reduction rate to be a reference of termination of the intake control of the sub-throttle valve 22. This termination determination value is a value lower than the start determination value, and is previously set. When the moving average of the total output reduction rate is not equal to or less than the termination determination value, the process returns to step S207. When the moving average of the total output reduction rate becomes equal to or less than the termination determination value, the process proceeds to step S209.

In step S209, the traction control unit 51 starts timekeeping. If the timekeeping is already in the middle of execution, the timekeeping is continued.

In step S210, the traction control unit 51 determines whether or not the state where the moving average of the total output reduction rate becomes equal to or less than the termination determination value lasts for a predetermined period of time. If the state does not last for the predetermined period of time, the process returns to step S207. If the state lasts for the predetermined period of time, the process proceeds to step S211. Note that when the moving average of the total output reduction rate does not become equal to or less than the termination determination value in step S208 during the timekeeping, the timekeeping is reset, and the process returns to step S207.

In step S211, the traction control unit 51 determines whether or not the throttle opening degree is less than the specified value. When the throttle opening degree is equal to or greater than the specified value, there is a high possibility that the occurrence of spin continues hereafter as well, so that the process returns to step S207, and the output reduction by closing the sub-throttle valve to throttle the intake passage, is continuously carried out. When the throttle opening degree is less than the specified value, it is judged that the driver returns the throttle with respect to the occurred spin, and the spin may be terminated, so that the process proceeds to step S212 in which the timekeeping is terminated, and then returns to step S201. In this case, the sub-throttle valve 22 is controlled into an opening side, resulting in that the opening degree becomes the normal opening degree from the target opening degree for the traction control, and the control returns to the normal control.

Figure 10:
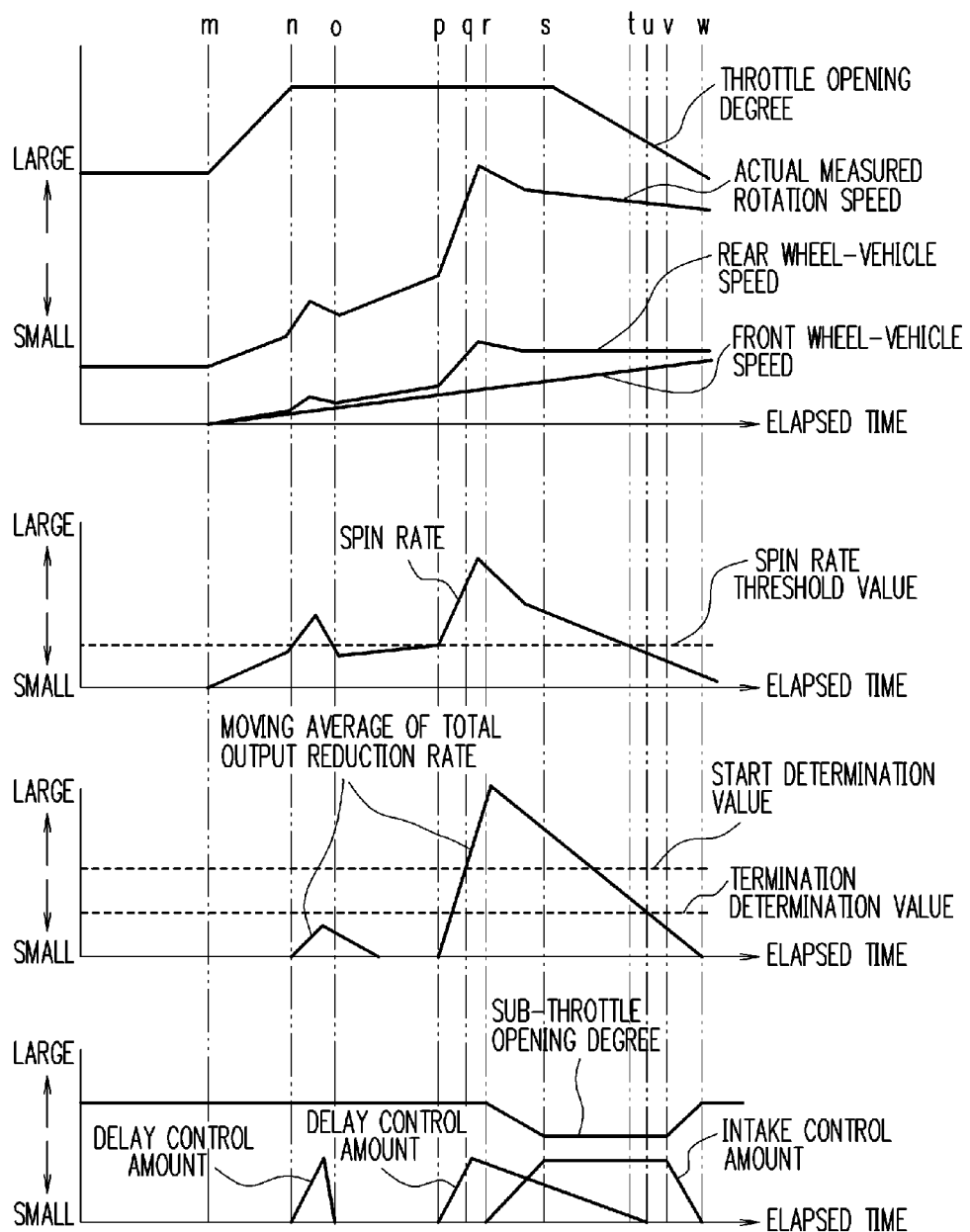
FIG. 10 is a diagram schematically illustrating an example of operations and a transition of state of respective parts of the motorcycle.

Here, explanation will be made on the transition of state of the motorcycle 1 in the intake control of the sub-throttle valve 22. FIG. 10 is a diagram schematically illustrating an example of operations and a transition of state of the respective parts of the motorcycle 1.

A timing m indicates a timing at which the motorcycle 1 starts moving. At the timing m and thereafter, the rear wheel-vehicle speed and the front wheel-vehicle speed increase.

A timing n indicates a timing at which the rear wheel 12 spins, and the spin rate becomes equal to or greater than the spin rate threshold value. When the spin rate exceeds the spin rate threshold value, the search spin rate becomes to have a certain value. Consequently, the traction control unit 51 first starts the delay control, to thereby reduce the output of the engine unit 11.

A timing o indicates a timing at which the spin rate is lowered to a value equal to or less than the spin rate threshold value by the delay control of the traction control unit 51. When the spin rate becomes equal to or less than the spin rate threshold value, the traction control unit 51 terminates the delay control.

FIG. 10 illustrates a case where the total output reduction rate does not become equal to or greater than the start determination value during the timings n to o. In such a case, the traction control unit 51 reduces the output of the engine unit 11 only by the delay control, and the sub-throttle valve 22 is controlled in a normal manner. Further, even in a case where the total output reduction rate becomes equal to or greater than the start determination value, if that state does not last for a predetermined period of time or longer, the traction control unit 51 reduces the output of the engine unit 11 only by the delay control. As described above, the traction control unit 51 starts the delay control in preference to the intake control.

A timing p indicates a timing at which the rear wheel 12 spins again, resulting in that the spin rate exceeds the spin rate threshold value. When the spin rate exceeds the spin rate threshold value, the traction control unit 51 calculates the search spin rate, and calculates the total output reduction rate from the calculated search spin rate. Subsequently, the traction control unit 51 starts the delay control by setting the calculated total output reduction rate as the target value.

A timing q indicates a timing at which the moving average of the calculated total output reduction rate becomes equal to or greater than the start determination value ("Yes" in step S202). In this case, the traction control unit 51 starts timekeeping (step S203).

A timing r indicates a timing at which a predetermined period of time elapses from the start of the timekeeping ("Yes" in step S204). If the timing reaches the timing r while maintaining a state where the moving average of the total output reduction rate is equal to or greater than the start determination value, the traction control unit 51 judges whether or not the throttle opening degree is equal to or greater than the specified value (step S205). Further, if the throttle opening degree is equal to or greater than the specified value, the traction control unit 51 sets the target opening degree of the sub-throttle valve 22 to the target opening degree for the traction control (step S207), and makes the opening degree of the sub-throttle valve 22 to be gradually changed and shifted to the target opening degree. Accordingly, the opening degree of the sub-throttle valve 22 is throttled, and the output of the engine unit 11 is reduced. A timing s indicates a timing at which the opening degree of the sub-throttle valve 22 becomes the target opening degree for the traction control. A timing t indicates a timing at which the spin rate becomes equal to or less than the spin rate threshold value. As above, when the opening degree of the sub-throttle valve 22 is throttled, the output of the engine unit 11 is reduced, and in accordance with that, the spin rate is reduced to be equal to or less than the spin rate threshold value.

A timing u indicates a timing at which the moving average of the total output reduction rate becomes equal to or less than the termination determination value. When the total output reduction rate becomes equal to or less than the termination determination value ("Yes" in step S208), the traction control unit 51 starts timekeeping (step S209).

A timing v indicates a timing at which a predetermined period of time elapses from the start of the timekeeping. When the predetermined period of time elapses from the start of the timekeeping ("Yes" in step S210), the traction control unit 51 determines whether or not the throttle opening degree is equal to or less than the termination determination value (step S211). Further, if the throttle opening degree is equal to or less than the termination determination value ("Yes" in S211), the traction control unit 51 returns the target opening degree of the sub-throttle valve 22 to the normal target opening degree (step S201), and makes the opening degree of the sub-throttle valve 22 to be gradually changed to the target opening degree for the normal control.

A timing w indicates a timing at which the opening degree of the sub-throttle valve 22 returns to the target opening degree for the normal control. When the timing reaches the timing w, the sub-throttle valve 22 is returned to be subjected to the normal control by the throttle body control unit of the ECU 5.

As described above, the traction control unit 51 starts the delay control in preference to the intake control. Further, when the state where the moving average of the total output reduction rate is equal to or greater than the start determination value lasts for the predetermined period of time, the traction control unit 51 starts the intake control of throttling the opening degree of the sub-throttle valve 22. According to the configuration as above, at a moment right after the spin of the rear wheel 12 starts, the spin can be reduced instantaneously by the delay control with good response characteristic. Meanwhile, when the state where the spin of the rear wheel 12 is large lasts, the spin of the rear wheel 12 can be reduced by the intake control of the sub-throttle valve 22. With the use of the intake control, it is possible to increase the range with which the total output reduction rate can deal, so that it is possible to deal with a situation in which, in a situation at the time of the traveling on a road surface with a low friction coefficient where a spin easily occurs and the like, a relatively large spin occurs, and a large output reduction is required. Further, since there is no need to deal with the situation using only the delay amount or to increase the delay for a long period of time to reduce the large spin, the generation of backfire and after-burn caused by the worsening of combustion state, and the increase in exhaust-gas temperature can be suppressed, resulting in that the damage of the catalyst can be prevented or suppressed. As above, according to the present embodiment, it is possible to realize the traction control capable of preventing or suppressing the damage of the catalyst, and having a good response characteristic.

Here, a hardware configuration of the ECU 5 will be briefly described. The ECU 5 has a computer including a CPU, a ROM, and a RAM. In the ROM, a computer program for controlling the engine unit 11 including one regarding the above-described traction control, the aforementioned respective tables, respective maps, and respective settings are stored. The CPU reads the computer program stored in the ROM, and expands and executes the computer program on the RAM. At this time, the aforementioned respective tables are referred to according to need. Accordingly, the computer functions as the above-described respective units, resulting in that the aforementioned processing is realized. Note that it is possible to employ a configuration in which the aforementioned processing is executed by single hardware, or it is also possible to employ a configuration in which the aforementioned processing is executed by a cooperation of a plurality of pieces of hardware. Further, it is also possible that the ECU 5 has an external storage medium, and the aforementioned computer program, respective tables, respective maps and predetermined information are stored in the external storage medium in a computer-readable manner. In this case, the CPU reads the computer program from the external storage medium to execute the computer program, and reads and uses the respective tables, the respective maps, and the predetermined information from the storage medium according to need.

In the foregoing, the embodiment of the present invention is described in detail while referring to the drawings, but, the above-described embodiment only shows a concrete example in carrying out the present invention. The technical scope of the present invention is not limited to the above-described embodiment. Various changes can be made in the present invention without departing from its spirit, and they are also included in the technical scope of the present invention.

According to the present invention, the calculation unit of spin rate is switched between the starting state and the traveling state. For this reason, even in the case where the clutch is not connected, the spin of the driving wheel can be prevented or suppressed, and further, the variation of the engine speed can be suppressed. Further, according to the present invention, by using the thinning-out rate map, it is possible to easily set the thinning-out rate in accordance with the specification of the engine. Further, according to the present invention, since it is possible to increase the output reduction rate, it is possible to deal with the traveling on the road surface with the low friction coefficient as well. Further, according to the present invention, the output of the engine unit is reduced only by the delay control of the ignition timing when the spin of the driving wheel is small, and when the spin of the driving wheel is large, the control of opening degree of the sub-throttle valve is conducted. Accordingly, since there is no need to excessively increase the delay amount, and there is no chance that the delay control is carried out for a long period of time, it is possible to realize the traction control capable of preventing or suppressing the damage of the catalyst, and having the good response characteristic.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

The present invention is a technique effective for a traction control device of a vehicle. Further, according to the present invention, it is possible to realize a traction control capable of preventing or suppressing a spin of a driving wheel even in a case where a clutch is not connected, and capable of suppressing a variation of engine speed. Further, according to the present invention, it is possible to easily set a thinning-out rate in accordance with a specification of an engine, and to increase an output reduction rate, so that it is possible to deal with a traveling on a road surface with a low friction coefficient as well. Further, according to the present invention, it is possible to realize a traction control capable of preventing or suppressing a damage of a catalyst, and having a good response characteristic.

What is claimed is:
1. A traction control device reducing an output of an engine for suppressing a spin of a driving wheel of a vehicle, comprising:

a first spin detector detecting the spin of the driving wheel based on a vehicle speed calculated from a rotation of a driven wheel to which a driving force is not transmitted from the engine, and a vehicle speed calculated from a rotation of the driving wheel to which the driving force is transmitted from the engine;

a second spin detector detecting the spin of the driving wheel based on a speed of the vehicle calculated from the rotation of the driven wheel, and a speed of the vehicle calculated from a rotation of the engine; and a traveling determination unit determining whether the vehicle is in a starting state or a traveling state;

wherein when the traveling determination unit determines that the vehicle is in the starting state, the first spin detector detects the spin of the driving wheel; and wherein when the determination unit determines that the vehicle is in the traveling state, the second spin detector detects the spin of the driving wheel.

2. The traction control device according to claim 1, further comprising:

a clutch connecting or disconnecting the transmission of the driving force between the engine and the driving wheel, wherein the determination unit determines that the clutch is connected when a rotation speed of the engine calculated from a rotation speed of the driving wheel falls within a predetermined range with respect to an actual rotation speed of the engine.

3. The traction control device according to claim 2, wherein the determination unit determines that the vehicle is in the traveling state when a state in which the clutch is connected lasts for a predetermined period of time.

4. The traction control device according to claim 2, wherein the determination unit determines that the clutch is not connected when the rotation speed of the engine calculated from the rotation speed of the driving wheel does not fall within the predetermined range with respect to the actual rotation speed of the engine.

5. The traction control device according to claim 4, wherein the determination unit determines that the vehicle is in the starting state when a state in which the clutch is not connected lasts for a predetermined period of time.

6. The traction control device according to claim 1, further comprising:

a storage unit storing a specified spin rate threshold value; and a traction control unit reducing an output of an engine by calculating an output reduction rate of the engine in accordance with a search spin rate being a value as a result of subtracting the threshold value from the spin rate of the driving wheel detected from one of the first and the second spin detectors.

7. The traction control device according to claim 6, wherein a plurality of modes each having a different relationship between the search spin rate and the output reduction rate are provided, and the mode in accordance with a selection made by a driver is used.

8. The traction control device according to claim 6, wherein the engine has a plurality of cylinders, wherein in accordance with a thinning-out rate being a proportion of cylinders, out of the plurality of cylinders, from which an output is reduced, the cylinder from which the output is reduced is selected from the plurality of cylinders for each cycle.

9. The traction control device according to claim 8, wherein a matrix table in which a numeric value of 0 to 100 is randomly assigned, to each of the plurality of cylinders along a plurality of cycles, for each of the cycles is provided, and the output is reduced, regarding each of the plurality of cylinders, in the cycle to which the numeric value equal to or less than the thinning-out rate is assigned by the matrix table.

10. The traction control device according to claim 8, wherein when the output reduction rate cannot be realized by the reduction in the output of the selected cylinders, the reduction in the output of the selected cylinders is maximized, and an output of the remaining cylinders is also reduced.

11. The traction control device according to claim 1, further comprising:

a traction control unit reducing an output of an engine by:

executing a delay control of reducing the output of the engine by delaying an ignition timing of the engine, and executing an intake control of reducing the output of the engine by reducing an amount of air for combustion which is supplied to the engine, the delay control being started in preference to the intake control.

12. The traction control device according to claim 11, wherein the intake control is started when a state in which a moving average of a required output reduction rate is equal to or greater than a predetermined determination value lasts for a predetermined period of time.

13. The traction control device according to claim 11, wherein the intake control is terminated when a state in which the moving average of the required output reduction rate is equal to or less than a predetermined determination value lasts for a predetermined period of time.

14. The traction control device according to claim 11, wherein a main throttle valve operated by a driver and a sub-throttle valve which is different from the main throttle valve are further provided, wherein in the intake control, the output of the engine is reduced by throttling an opening degree of the sub-throttle valve.

* * * * *